United States Patent
Becker

(10) Patent No.: US 6,474,663 B1
(45) Date of Patent: Nov. 5, 2002

(54) COMBINED PAIR OF LADDERS AND TRANSPORTATION DOLLY DEVICE

(76) Inventor: Jimmy J. Becker, W. 2608 Hwy. 11-81, Juda, WI (US) 53550

(*) Notice: Subject to any disclaimer, the term of this patent is extended or adjusted under 35 U.S.C. 154(b) by 0 days.

(21) Appl. No.: 09/612,151

(22) Filed: Jul. 7, 2000

(51) Int. Cl.$^7$ .................................................. B62B 1/12
(52) U.S. Cl. .................. 280/47.18; 280/30; 280/47.21; 280/47.24; 182/16; 182/21; 182/104
(58) Field of Search .............................. 280/30, 9, 638, 280/35, 639, 38, 643, 651, 652, 654, 659, 43, 43.1, 47.131, 47.17, 47.18, 47.21, 47.24; 182/20, 16, 21, 104, 129

(56) References Cited

U.S. PATENT DOCUMENTS

| | | | | |
|---|---|---|---|---|
| 1,221,579 A | * | 4/1917 | Olds ............................ | 280/30 |
| 3,430,972 A | * | 3/1969 | Fiedler ......................... | 280/30 |
| 3,954,155 A | | 5/1976 | Guidara | |
| 4,235,449 A | | 11/1980 | Tarran | |
| 4,258,826 A | * | 3/1981 | Murray ........................ | 182/20 |
| 4,494,626 A | * | 1/1985 | Ast ............................ | 280/30 X |
| 4,934,485 A | * | 6/1990 | Purkapile ................... | 280/30 X |
| 4,934,718 A | * | 6/1990 | Voegele ........................ | 280/30 |
| 5,118,124 A | * | 6/1992 | Storay et al. ............ | 280/47.21 |
| 5,382,032 A | | 1/1995 | Wilson | |
| 5,505,471 A | * | 4/1996 | Cheng ......................... | 280/30 |
| 5,836,595 A | * | 11/1998 | Brice .......................... | 280/30 |
| 6,158,749 A | * | 12/2000 | Roudebush .......... | 280/47.18 X |
| 6,273,438 B1 | * | 8/2001 | Prapavat .................. | 280/47.21 |

* cited by examiner

*Primary Examiner*—Donald P. Walsh
*Assistant Examiner*—F. Zeender
(74) *Attorney, Agent, or Firm*—David J. Archer

(57) ABSTRACT

What is disclosed is a combined pair of ladders and transportation dolly device. The device includes a first framework having a first and a second end and a second framework having a first and a second extremity. The first extremity of the second framework is pivotally secured to the first end of the first framework about a first pivotal axis. A loading platform is provided for supporting a load. The platform has a first and a second edge. The platform is pivotally secured to the second end of the first framework about a second pivotal axis, the second axis being disposed between the first and the second edges of the platform. A tie bar has a first and second termination with the first termination being pivotally secured to the second edge of the platform about a third pivotal axis. The second termination of the platform is pivotally secured to the second framework about a fourth pivotal axis. The fourth pivotal axis is disposed between the first and the second extremities of the second framework. A wheel is rotatably secured to the platform. The arrangement is such that in a first mode of operating the device, when the first and second frameworks are pivoted away from each other, the frameworks constitute a pair of ladders. However, in a second mode of operating the device, when the first and second frameworks are pivoted towards each other, the wheel permits transportation of the device together with the load supported on the platform.

20 Claims, 4 Drawing Sheets

COMBINED PAIR OF LADDERS AND TRANSPORTATION DOLLY DEVICE

BACKGROUND OF THE INVENTION

1. Field of the Invention

The present invention relates to a combined pair of ladders and transportation dolly device. More specifically, the device is such that in one mode of operation, the device is able to be used as a pair of ladders and in a further mode, the device permits tansportation of a load.

2. Information Disclosure Statement

In the prior art, it is known to combine a pair of step ladders with a platform such that the step ladders can be converted to a transportation dolly for transporting a load. The present invention provides a distinct improvement over the known arrangements in that a tie bar is provided for urging pivotal movement of the platform so that transportation of a load placed on the platform is facilitated.

Therefore, it is a primary feature of the present invention, to provide a combined pair of ladders and transportation dolly device that overcomes the problems associated with the prior art devices and which make a considerable contribution to the art of transporting packages and the like.

Other features and advantages of the present invention will be readily apparent to those skilled in the art by a consideration of the detailed description contained herein with reference to the annexed drawings showing a preferred embodiment of the present invention.

SUMMARY OF THE INVENTION

The present invention relates to a combined pair of ladders and transportation dolly device. The device includes a first framework which has a first and a second end and a second framework which has a first and a second extremity. The first extremity of the second framework is pivotally secured to the first end of the first framework about a first pivotal axis. A loading platform is provided for supporting a load. The platform has a first and a second edge and the platform is pivotally secured to the second end of the first framework about a second pivotal axis. The second axis is disposed between the first and the second edges of the platform. A tie bar having a first and a second termination is arranged such that the first termination is pivotally secured to the second edge of the platform about a third pivotal axis. The second termination of the tie bar is pivotally secured to the second framework about a fourth pivotal axis. The fourth pivotal axis is disposed between the first and the second extremities of the second framework. A wheel is rotatably secured to the platform and the arrangement is such that in a first mode of operating the device, when the first and second frameworks are pivoted away from each other, the frameworks constitute a pair of ladders. Additionally, in a second mode of operation of the device, when the first and the second frameworks are pivoted towards each other, the wheel permits transportation of the device together with the load supported on the platform.

In a more specific embodiment of the present invention, the first framework includes a first and a second rail, the rails being spaced relative to each other. Also, the rails are disposed parallel relative to each other.

Furthermore, the first framework further includes a step having a first and a second side. The step extends between the first and the second rails.

More specifically, the first side of the step is secured to the first rail and the second side of the step is secured to the second rail. Additionally, the step is disposed between the first and the second ends of the first framework The second framework includes a first railing and a second railing which is spaced relative to the first railing. Preferably, the railings are disposed parallel to each other and the second framework further includes a rung having a first and a second side. The rung extends between the railings.

The first side of the rung is secured to the first railing and the second side of the rung is secured to the second railing. Also, the rung is disposed between the first and second extremities of the second framework.

Moreover, the platform includes a first portion having a frontward and a rearward end for supporting the load. A second portion has a bottom and a top edge with the bottom edge being secured to the rearward end of the first portion and extending angularly from the rearward end such that the portions cooperate together to support the load.

The platform further includes a side member which is secured to and extends from the second portions towards the second edge of the platform. A second side member is secured to and extends from the second portion towards the second edge of the platform. The first and the second side members are disposed spaced and parallel relative to each other. The second pivotal axis extends through the first and the second side members.

The first, second, third and fourth pivotal axes are disposed parallel and spaced relative to each other.

The device further includes a further tie bar which is disposed spaced and parallel to the tie bar. The further tie bar has a further first termination and a further second termination. The third pivotal axis extends through the first termination and the further first termination. The fourth pivotal axis extends Through the second termination and the further second termination.

The device further includes a further wheel, the wheel and the further wheel being rotatable about the third pivotal axis.

Additionally, when the second framework is pivoted from the first to the second mode thereof, the tie bar urges the platform about the third pivotal axis such that the wheel causes the platform and the load disposed thereon to be raised so that the device operates in the second mode thereof.

Also, the device according to the present invention includes a handle which extends from the first end and the first extremity of the frameworks for stabilizing a user of the device when the device is being used in the first mode and for assisting a user in lifting the load when the device is being operated in the second mode thereof as a transportation dolly.

Many modifications and variations of the present invention will be readily apparent to those skilled in the art by a consideration of the detailed description contained hereinafter. However, such modifications and variations fall within the spirit and scope of the present invention as defined by the appended claims.

BRIEF DESCRIPTION OF THE DRAWINGS

Similar reference characters refer to similar parts throughout the various views of the drawings.

DETAILED DESCRIPTION OF THE DRAWINGS

Figure 1:
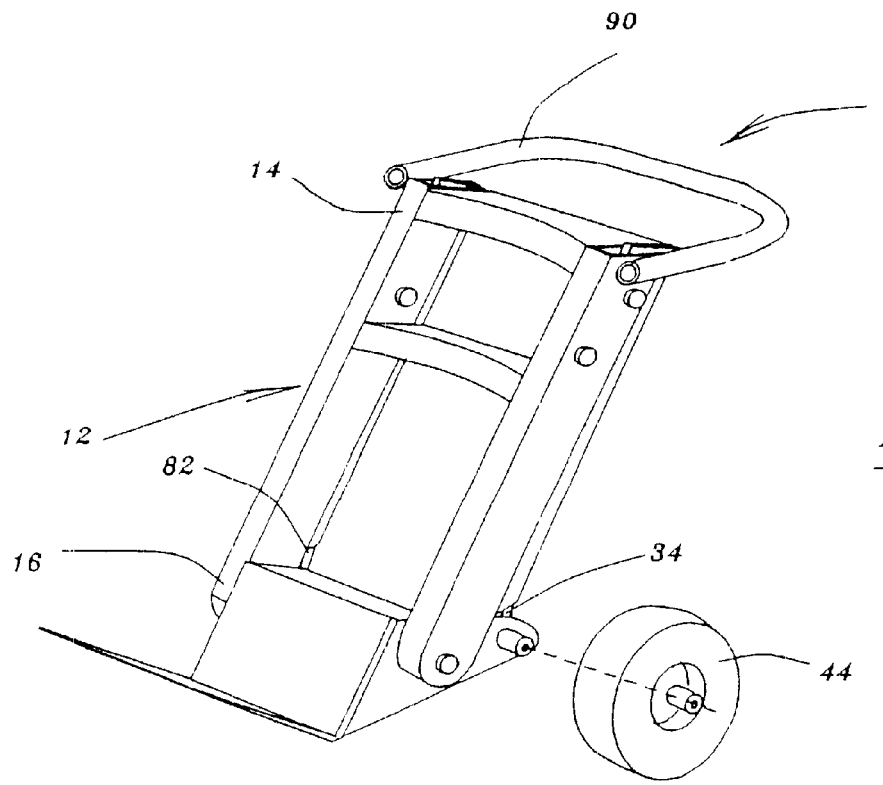
FIG. 1 is a perspective view of a combined pair of ladders and transportation dolly device according to the present invention.

FIG. 1 is a perspective view of a combined pair of ladders and transportation dolly device generally designated 10 according to the present invention. As shown in FIG. 1, the device 10 includes a first framework generally designated 12 having a first and a second end 14 and 16 respectively.

Figure 2:
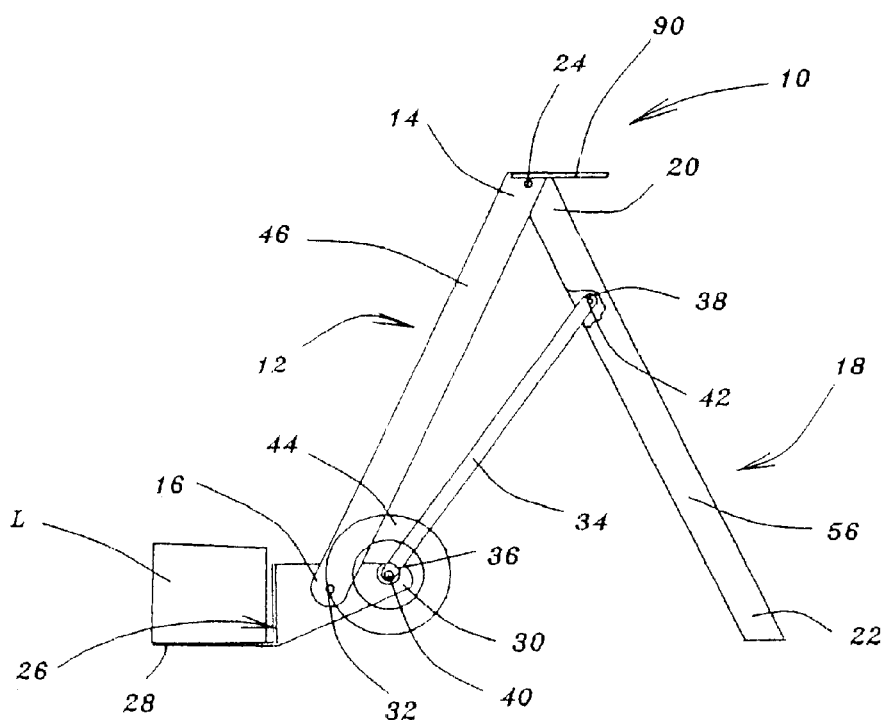
FIG. 2 is a side elevational view of the device shown in FIG. 1 with the device disposed in a first mode thereof.

FIG. 2 is a side elevational view of the device 10 shown in FIG. 1 but with the device disposed in a first mode of operation as a pair of step ladders. As shown in FIG. 2, a second framework generally designated 18 has a first and a second extremity 20 and 22 respectively. The first extremity 20 of the second framework 18 is pivotally secured to the first end 14 of the first framework 12 about a first pivotal axis 24. A loading platform generally designated 26 is provided for supporting a load L. The platform 26 has a first and a second edge 28 and 30 respectively. The platform 26 is pivotally secured to the second end 16 of the first framework 12 about a second pivotal axis 32. The second axis 32 is disposed between the first and the second edges 28 and 30 of the platform 26.

A tie bar 34 has a first and a second termination 36 and 38 respectively. The first termination 36 of the tie bar 34 is pivotally secured to the second edge 30 of the platform 26 about a third pivotal axis 40. The second termination 38 is pivotally secured to the second framework 18 about a fourth pivotal axis 42. The fourth pivotal axis 42 is disposed between the first and the second extremities 20 and 22 of the second framework 18.

A wheel 44 is rotatably secured to the platform 26 and the arrangement is such that, in a first mode of operating the device 10, when the first and second framework 12 and 18 respectively are pivoted away from each other, as shown in FIG. 2, the frameworks 12 and 18 constitute the pair of ladders. However, in a second mode of operating the device 10, as shown in FIG. 1, when the first and second frameworks 12 and 18 respectively are pivoted towards each other about axis 24, the wheel 44 permits transportation of the device 10 together with the load L supported on the platform 26.

Figure 3:
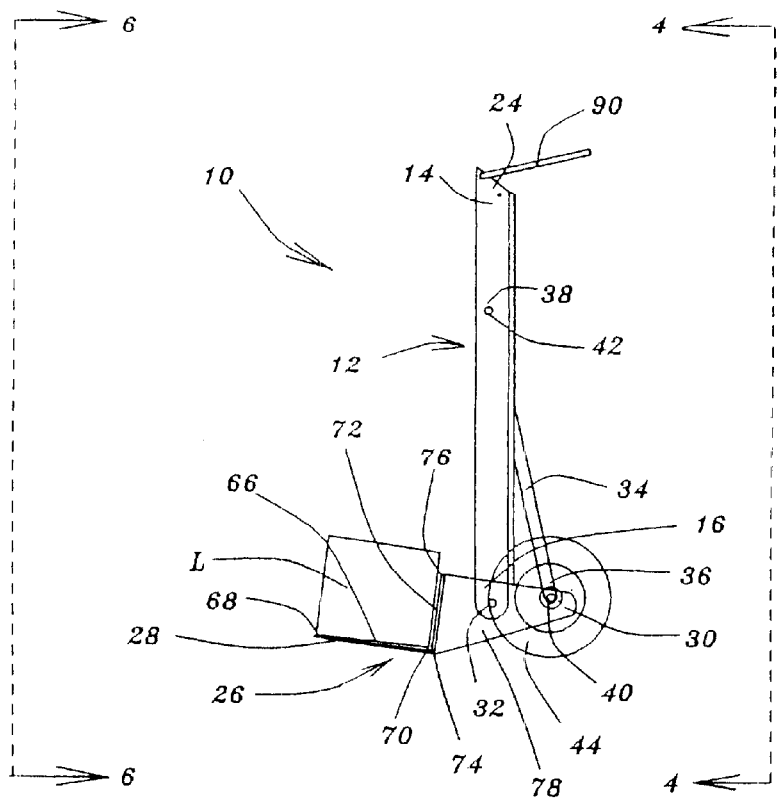
FIG. 3 is a similar view to that shown in FIG. 2 but shows the device disposed in a second mode thereof.

FIG. 3 is a side elevational view of the device 10 shown in FIG. 1 with the device 10 disposed in the second mode thereof for operation as a transportation dolly.

Figure 4:
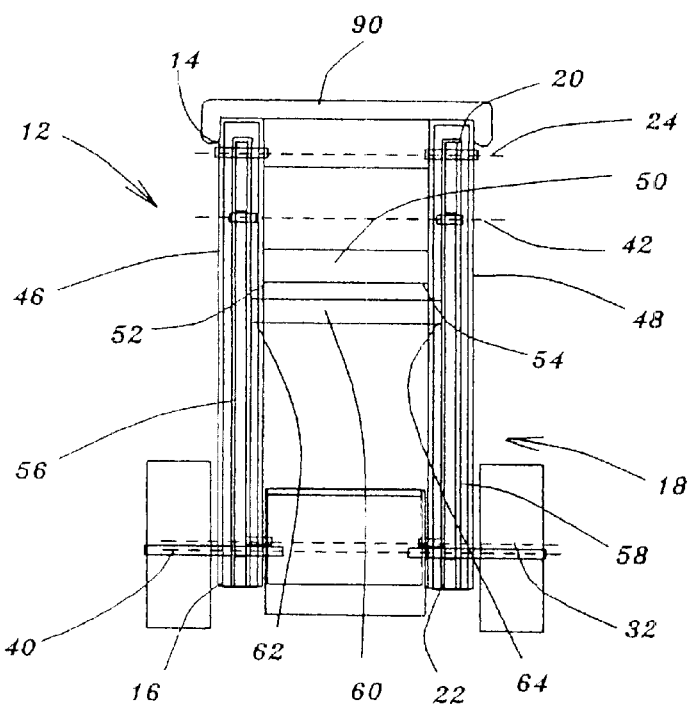
FIG. 4 is a view taken on the line 4—4 of FIG. 3.

FIG. 4 is a view taken on the line 4—4 of FIG. 3. As shown in FIG. 4, the first framework 12 includes a first rail 46 and a second rail 48 spaced relative to the first rail 46. Preferably the rails 46 and 48 are disposed parallel relative to each other. Furthermore, the first framework 12 further includes a step 50 having a first and a second side 52 and 54 respectively. The step 50 extends between the rails 46 and 48. The first side 52 of the step 50 is secured to the first rail 46. The second side 54 of the step 50 is secured to the second rail. The step 50 is disposed between the first and the second ends 14 and 16 respectively of the first framework 12.

The second framework 18 includes a first railing 56 and a second railing 58 spaced relative to the first railing 56. The railings 56 and 58 respectively are disposed parallel relative to each other. Also, the second framework 18 further includes a rung 60 which has a first and a second side 62 and 64 respectively. The rung 60 extends between the railings 56 and 58. Furthermore, the first side 62 of the rung 60 is secured to the first railing 56 and the second side 64 of the rung 60 is secured to the second railing 58. The rung 60 is disposed between the first and the second extremities 20 and 22 respectively of the second framework 18. The railings 56 and 58 are respectively housed within the rails 46 and 48 when the device 10 is operating in the second mode thereof as shown in FIG. 1.

As shown in FIG. 3, the platform 26 includes a first portion 66 which has a frontward and a rearward end 68 and 70 respectively for supporting the load L. A second portion 72 of the platform 26 has a bottom and a top edge 74 and 76 respectively. The bottom edge 74 is secured to the rearward end 70 of the first portions 66 and extends angularly away from the rearward end 70 such the portions 66 and 72 cooperate together to support the load L. Additionally, the platform 26 further includes a first side member 78 which is secured to and extends from the second portion 72 towards the second edge 30 of the platform 26.

Figure 5:
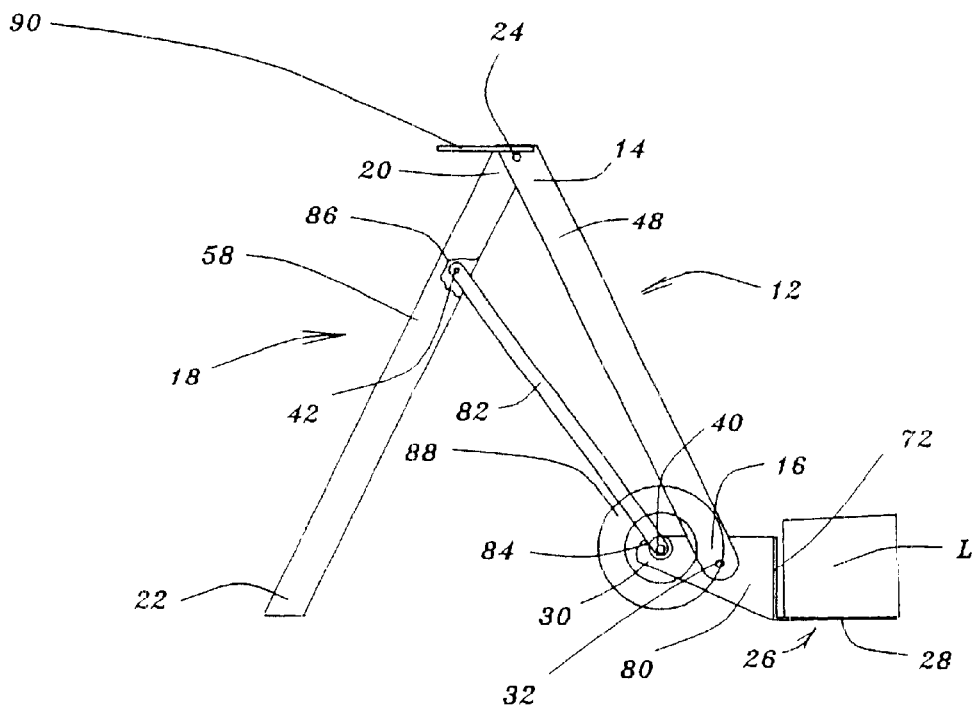
FIG. 5 is a similar view to that shown in FIG. 2 but viewed from the opposite side.

FIG. 5 is a similar view to that shown in FIG. 2 but viewed from the opposite side. As shown in FIG. 5, a second side member 80 is secured to and extends from the second portion 72 towards the second edge 30 of the platform 26. The first and the second side members 78 and 80 are disposed spaced and parallel relative to each other.

The second pivotal axis 32 extends through the first and the second side members 78 and 80. Additionally, the first, second, third and fourth pivotal axes 24, 32, 40 and 42 respectively are disposed parallel and spaced relative to each other.

Furthermore, the device 10 further includes a further tie bar 82 as shown in FIG. 5. The further tie bar 82 is disposed spaced and parallel relative to the tie bar 34. The further tie bar 82 has a further first termination 84 and a further second termination 86. The third pivotal axis 40 extends through the first termination 36 and the further first termination 84. The fourth pivotal axis 42 extends through the second termination 38 and the further second termination 86.

The device 10 also includes a further wheel 88. The wheel 44 and the further wheel 88 are rotatable about the third pivotal axis 40.

Figure 6:
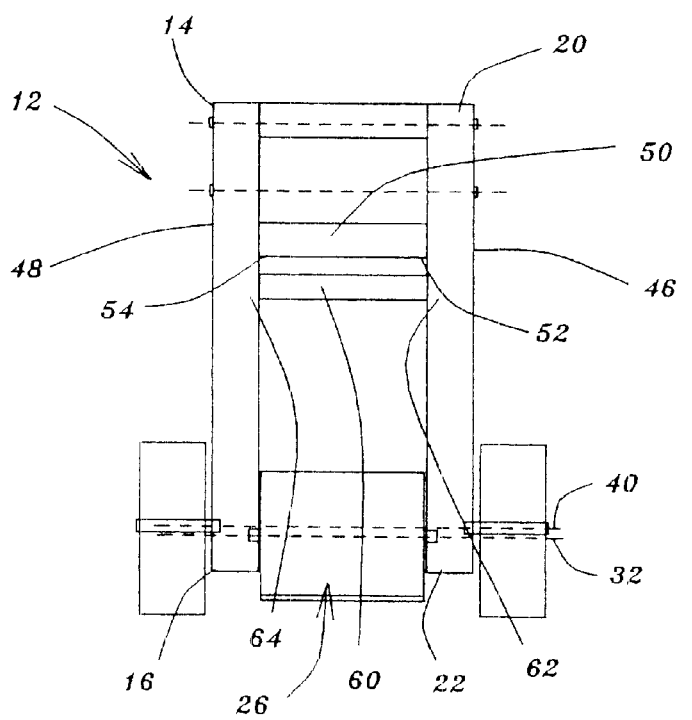
FIG. 6 is a view taken on the line 6—6 of FIG. 3.

The arrangement is such that when the second framework 18 is pivoted from the first to the second mode as shown in FIG. 1, the tie bar 34 urges the platform 26 about the third pivotal axis 40 such that the wheel 44 causes the platform 26 and the load L disposed thereon to be raised so that the device 10 operates in the second mode thereof FIG. 6 is a view taken on the line 6—6 of FIG. 3 and shows the device 10 viewed from the front thereof As shown in FIG. 6, the rails 46 and 48 are disposed parallel relative to each other.

Figure 7:
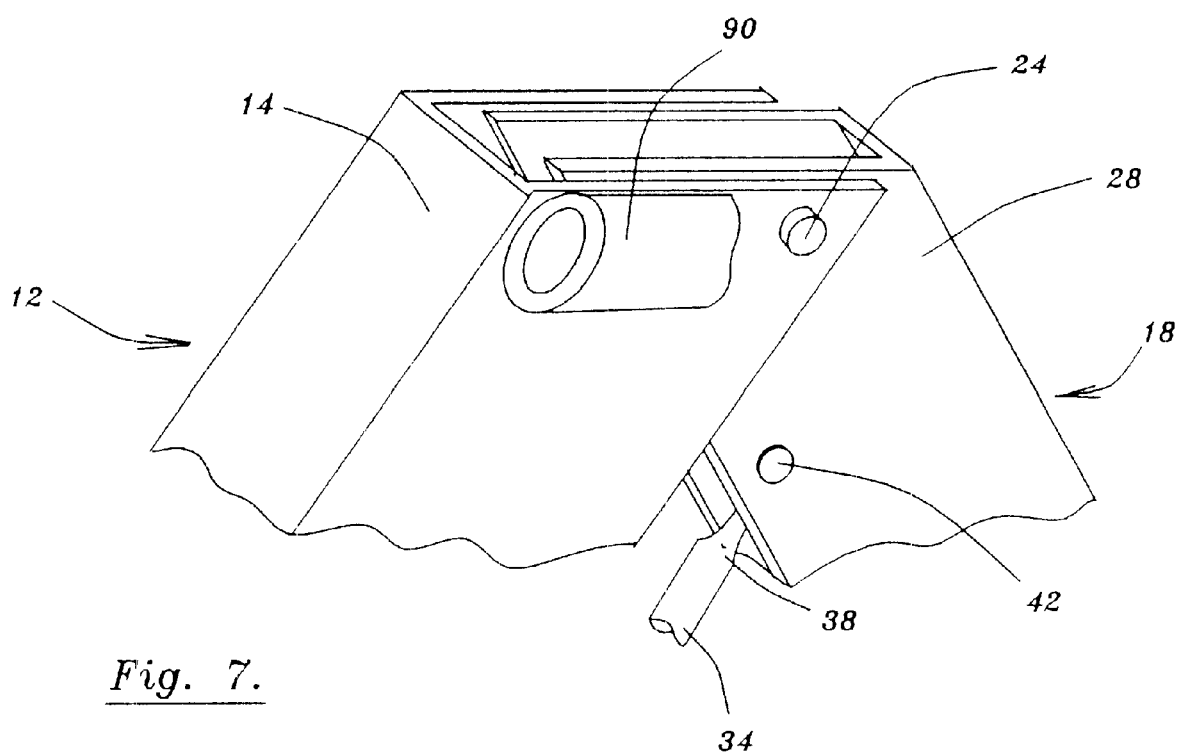
FIG. 7 is an enlarged perspective view of part of the device shown in FIG. 1 showing the first and fourth axes thereof.

FIG. 7 is an enlarged perspective view of the first pivotal axis about which the first framework 12 and the second framework 18 pivot. As shown in FIG. 7, the railings 56 and 58 are able to be housed within the rails 46 and 48 when the device 10 is operating in the second mode thereof as shown in FIG. 1.

Additionally, as shown in FIGS. 1, 2, 3 and 7, a handle 90 extends from the first end 14 and the first extremity 20 of the frameworks 12 and 18 for stabilizing a user of the device 10 when the device 10 is being used in the first mode and for assisting a user in lifting the load when the device 10 is being operated in the second mode thereof as a transportation dolly.

The present invention provides a unique combination of a pair of ladders and a transportation dolly device which facilitates the transportation of packages and the like.

What is claimed is:

1. A combined pair of ladders and transportation dolly device, said device comprising:

a first framework having a first and a second end;

a second framework having a first and a second extremity, said first extremity of said second framework being pivotally secured to said first end of said first framework about a first pivotal axis;
a loading platform for supporting a load, said platform having a first and a second edge, said platform being pivotally secured to said second end of said first framework about a second pivotal axis, said second axis being disposed between said first and second edges thereof;
a tie bar having a first and a second termination, said first termination being pivotally secured to said second edge of said platform about a third pivotal axis, said second termination being pivotally secured to said second framework about a fourth pivotal axis, said fourth axis being disposed between said first and second extremities thereof; and a wheel rotatably secured to said platform, the arrangement being such that in a first mode of operating the device, when said first and second frameworks are pivoted away from each other, said frameworks constitute said pair of ladders and in a second mode of operating said device, when said first and second frameworks are pivoted towards each other, said wheel permits transportation of the device together with the load supported on said platform.

2. A combined pair of ladders and transportation dolly device as set forth in claim 1 wherein
said first framework includes:
a first rail;
a second rail spaced relative to said first rail.

3. A combined pair of ladders and transportation dolly device as set forth in claim 2 wherein
said rails are disposed parallel relative to each other.

4. A combined pair of ladders and transportation dolly device as set forth in claim 2 wherein
said first framework further includes:
a step having a first and a second side, said step extending between said rails.

5. A combined pair of ladders and transportation dolly device as set forth in claim 4 wherein
said first side of said step is secured to said first rail and said second side of said step is secured to said second rail.

6. A combined pair of ladders and transportation dolly device as set forth in claim 4 wherein
said step is disposed between said first and said second end of said first framework.

7. A combined pair of ladders and transportation dolly device as set forth in claim 1 wherein
said second framework includes:
a first railing;
a second railing spaced relative to said first railing.

8. A combined pair of ladders and transportation dolly device as set forth in claim 7 wherein
said railings are disposed parallel relative to each other.

9. A combined pair of ladders and transportation dolly device as set forth in claim 7 wherein
said second framework further includes:
a rung having a first and a second side, said rung extending between said railings.

10. A combined pair of ladders and transportation dolly device as set forth in claim 9 wherein
said first side of said rung is secured to said first railing and said second side of said rung is secured to said second railing.

11. A combined pair of ladders and transportation dolly device as set forth in claim 9 wherein
said rung is disposed between said first and said second extremities of said second framework.

12. A combined pair of ladders and transportation dolly device as set forth in claim 1 wherein
said platform includes:
a first portion having a frontward and rearward end for supporting the load;
a second portion having a bottom and a top edge, said bottom edge being secured to said rearward end of said first portion and extending angularly away from said rearward end such that said portions cooperate together to support the load.

13. A combined pair of ladders and transportation dolly device as set forth in claim 12 wherein
said platform further includes:
a first side member secured to and extending from said second portion towards said second edge of said platform;
a second side member secured to and extending from said second portion towards said second edge of said platform.

14. A combined pair of ladders and transportation dolly device as set forth in claim 13 wherein
said first and second side members are disposed spaced and parallel relative to each other.

15. A combined pair of ladders and transportation dolly device as set forth in claim 13 wherein
said second pivotal axis extends through said first and said second side members.

16. A combined pair of ladders and transportation dolly device as set forth in claim 1 wherein
said first, second, third and fourth pivotal axes are disposed parallel and spaced relative to each other.

17. A combined pair of ladders and transportation dolly device as set forth in claim 1 further including:
a further tie bar disposed spaced and parallel to said tie bar, said further tie bar having a further first termination and a further second termination, said third pivotal axis extending through said first termination and said further first termination, said fourth pivotal axis extending through said second termination and said further second termination.

18. A combined pair of ladders and transportation dolly device as set forth in claim 1 further including:
a further wheel, said wheel and further wheel being rotatable about said third pivotal axis.

19. A combined pair of ladders and transportation dolly device as set forth in claim 1 wherein
when said second framework is pivoted from said first to said second mode, said tie bar urges said platform about said second pivotal axis such that said wheel causes said platform and the load disposed thereon to be raised so that the device operates in said second mode thereof.

20. A combined pair of ladders and transportation dolly device as set forth in claim 1 further including:
a handle extending from said first end and said first extremity of said frameworks for stabilizing a user of the device when the device is being used in said first mode and for assisting a user in lifting the load when the device is being operated in said second mode thereof.

* * * * *